United States Patent [19]

Cessna, Jr.

[11] 3,972,668

[45] Aug. 3, 1976

[54] PRESSLESS INJECTION MOLDING APPARATUS

[75] Inventor: Lawrence C. Cessna, Jr., Newark, Del.

[73] Assignee: Hercules Incorporated, Wilmington, Del.

[22] Filed: Feb. 19, 1975

[21] Appl. No.: 551,178

[52] U.S. Cl. .......................... 425/242 R; 425/450.1; 425/451.9
[51] Int. Cl.² ............................................. B29F 1/00
[58] Field of Search .......... 425/242 R, 450.1, 451.9, 425/405, 405 H, 806; 264/328

[56] References Cited
UNITED STATES PATENTS

| | | | |
|---|---|---|---|
| 2,389,169 | 11/1945 | Stacy | 425/149 |
| 2,433,132 | 12/1947 | Lester | 425/242 |
| 3,071,814 | 1/1963 | Guggenheim | 425/128 |
| 3,158,089 | 11/1964 | Fillol | 425/405 H |
| 3,346,924 | 10/1967 | Lombard | 425/242 R |
| 3,776,998 | 12/1973 | Church | 264/328 |
| 3,782,879 | 1/1974 | Mnilk et al. | 425/450.1 |
| 3,833,333 | 9/1974 | Britten | 425/405 R |

FOREIGN PATENTS OR APPLICATIONS 2,027,934  12/1971  Germany ........................ 425/451.9

OTHER PUBLICATIONS

"Modern Plastics Encyclopedia", 1972–1973; vol. 49: No. 10A, pp. 612, 616.

Primary Examiner—Francis S. Husar
Assistant Examiner—John McQuade
Attorney, Agent, or Firm—Stanley A. Becker

[57] ABSTRACT

The apparatus of this invention relates to an injection molding device having separable mold plates into which fluid plastic is injected to form an article and which utilizes the injection pressure of the fluid plastic to generate forces sufficient to overcome the internal forces urging the mold plates apart and thus hold the mold plates together until the material being molded solidifies either by cooling, chemical reaction or phase change.

4 Claims, 1 Drawing Figure

U.S. Patent  Aug. 3, 1976  3,972,668
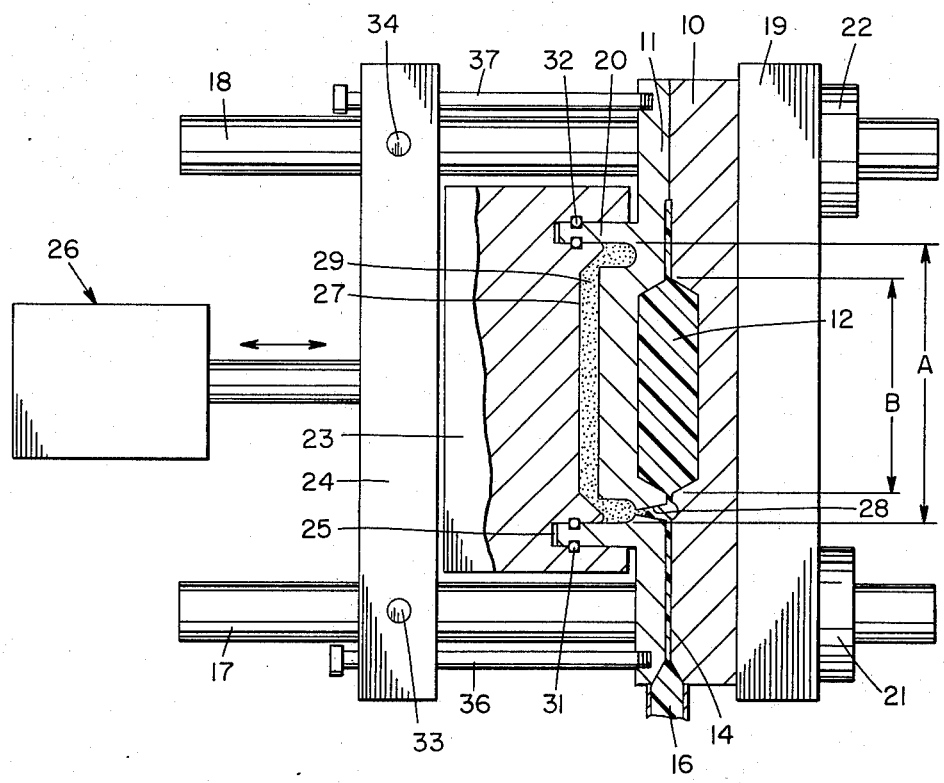

PRESSLESS INJECTION MOLDING APPARATUS

BACKGROUND OF THE INVENTION

This invention relates to a pressless injection molding apparatus and more particularly, to an apparatus utilizing the injection pressure of the fluid plastic to generate forces for holding the mold plates together.

Heretofore, the injection molding of items, and particularly items with a large projected area, have resulted in the need for molding machines to be equipped with massive mold closing and clamping devices to overcome the mold opening forces operated by the injection pressures on the fluid plastic being molded. Such devices are usually in the form of sophisticated and expensive hydraulic press systems and are responsible for much of the space taken up by the molding machine, as well as much of the cost.

SUMMARY OF THE INVENTION

The subject apparatus includes a pair of mold plates one of which is stationary and the other of which is movable. Behind the movable mold plate and a backup plate is a false cavity which is filled with a substantially incompressible compliant material. A conventional injection machine is used to feed resin to the mold through an injection nozzle and a passageway formed in the mold plates. While parting line injection is described herein, it is understood that conventional plastic injection through one of the mold plates could also be utilized. Seals are provided in the injection passageway to prevent the material from flowing out from between the mold plates. A connecting channel is provided between the false cavity and the injection molding passageway. In operation, the mold is closed by a small initial clamping force such as provided by a low force ram. Resin under injection pressure is then injected into the mold cavity and also is transmitted through the channel to transmit pressure to the compliant material in the false cavity. The false cavity desirable has a cross-sectional or projected area greater than the cross-sectional or projected area of the mold cavity. As the mold fills, pressure of the injected material acts on the compliant material in the false cavity and causes it to generate positive clamping forces urging the mold plates together and overcoming the force of the injected fluid tending to open the mold plates. By making the projected area of the false cavity greater than the projected area of the mold cavity, sufficient forces are generated by the compliant material to keep the mold closed. Thus, molding can be accomplished with relatively low auxiliary clamping forces in an efficient manner. Even if the projected area of the false cavity is less than that of the mold cavity clamping pressure requirements are reduced.

Other advantages of the present invention will be apparent from the following detailed description when considered in conjunction with the following detailed drawing, which drawing forms a part of the specification. It is to be noted, however, that the drawing illustrates only a typical embodiment of the invention and is therefore not to be considered limiting of its scope for the invention may admit to other equally effective embodiments.

BRIEF DESCRIPTION OF THE DRAWING

The drawing is a view partly in cross-section of apparatus for injection molding in accordance with the principles of this invention.

DESCRIPTION OF THE INVENTION

Referring to the drawing, there is shown an injection molding device in accordance with the principles of this invention having a stationary mold plate 10 and a movable mold plate 11. The adjacent faces of the mold plates are shaped to form a mold cavity 12 therebetween. A passageway 14 is formed between the adjacent mold faces to allow the entry of resin or fluid plastic 16 from a conventional injection machine which is not shown. The mold plates 10 and 11 are mounted on slide rods 17 and 18. The stationary mold plate 10 is backed up by a stiff static plate 19 which abuts against stops 21 and 22 to prevent further movement along the slide rods 17 and 18. Mold plate 11 typically has an annular projection 20 formed on its rear face. A movable mold backing plate 23 having a complementary annular groove 25 formed therein to receive the annular projection 20 is mounted for limited movement relative to the mold plate 11. This arrangement defines a false cavity 27 between the adjacent faces of mold plate 11 and movable backing plate 23. The false cavity 27 is filled with a substantially incompressible compliant material 29. Seals 31 and 32 are provided to seal the false cavity and prevent leakage of the compliant material. Other suitable arrangements can also be utilized to define and seal the false cavity. A passageway 28 is formed in the movable mold plate 11 to interconnect the injection passageway 14 with the cavity 27 holding the compliant material 29.

A movable platen 24 which is connected to a low force hydraulic or mechanical ram 26 is used to open and close the mold plates 10 and 11. To open the mold plates 10 and 11, a pair of tie rods 36 and 37 are provided. The tie rods are slip fitted through openings in the platen 24 and are threaded into the mold plate 11 so that when the platen 24 is retracted, the mold plate 11 moves therewith.

The false cavity 27 preferably has a projected area A greater than the projected area B of the mold cavity 12. The false cavity 27 is filled with a substantially incompressible compliant material 29 such as hydraulic fluid, grease or rubber. Among materials which are suitable for use in hot mold molding operations are hydraulic oils such as Exxon's Nutra 146, Exxon's Teresso 52, 56, 65 or 85, Union Carbide's Ucon LB300X, XY and 23D, Mid Sil Corporation's Silicone Fluid MS 200 and Dow Corning's Silicone oils of various grades. Among the hydraulic greases that could be utilized are Union Carbide's Ucon Hydralube, Mid Sil Corporation's Silicone Grease MS 44, and Dow Corning's Silicone Grease I, II and III. Many other materials could also be used, depending on the temperature requirements, such as silicone rubber and other oils and greases, or any other material which would transmit pressure without substantial change in volume under the conditions acquired.

In operation, the low force ram 26 is actuated to move the movable platen 24, backing plate 23 and movable mold plate 11 against the stationary mold plate 10. The ram 26 provides a relatively small initial clamping force. A conventional stop device is used to prevent any rearward motion of the movable backing plate 23. For example, air actuated stop pins 33 and 34 in the platen 24 can be moved into holes in the slide rods 17 and 18 to prevent any further movement of the platen 24 from its molding position. However, the action of the stop device alone is not enough to insure holding the mold faces closed because the normal mold opening forces caused by the injection pressure will distort the mold plates and other parts of the molding apparatus.

Resin under injection pressure is then injected into the mold cavity 12 through passageway 14. The injected resin also fills the passageway 28, thus transmitting pressure through the passageway 28 to the compliant material 29 in cavity 27. As the mold cavity 12 fills, and after filling, the injection pressure of the resin acts against the compliant material 29 and causes forces to be generated urging the mold plate 11 against mold plate 10 and thus counteracting forces within the mold tending to open and distort the mold plates 10 and 11. In view of the larger projected area of the cavity 27, the effect of the injection pressure acting against the compliant material 29 is such that the pressure tending to open the mold plates 10 and 11 is effectively counteracted and there remains positive forces urging the two mold plates together. Also, the closing force is now evenly distributed over the mold plates reducing distortion of these parts.

If it is desirable to maintain high clamping forces as the plastic in the mold cavity 12 solidifies, then the passageways 14 and 28 may be heated (or cooled if thermosetting plastics are used) so that continued pressurization of the compliant material can be maintained even after solidification of the article within the mold cavity 12.

Upon solidification of the article in the mold cavity 12, the stop pins 33 and 34 are deactuated, and the ram 26 is retracted allowing the mold plates 10 and 11 to separate and the injection molded article to be removed from the mold cavity 12.

It is to be understood that the above described embodiment is merely illustrative of applications of the principle of this invention and that numerous other arrangements and modifications may be made within the spirit and scope of the invention.

I claim:

1. Apparatus for injection molding comprising:
    a first stationary mold plate;
    a second mold plate linearly movable relative to said first mold plate, the adjacent faces of said mold plates being formed to define a mold cavity therebetween;
    at least one of said mold plates having a passageway formed therein to allow injection of fluid plastic material into said mold cavity;
    a backing plate mounted for limited linear movement relative to the rear face of said second mold plate;
    the adjacent faces of said backing plate and second mold plate defining a false cavity therebetween, said false cavity being filled with a substantially incompressible compliant material and being in communication with said passageway;
    means operatively connected to one of said mold plates for initially urging said mold plates together and for urging said backing plate toward said second mold plate; and
    means in communication with said passageway for injecting fluid plastic material under pressure into said passageway to fill said mold cavity and to exert pressure on said compliant material to generate force urging the mold plates together to counteract the forces generated within the mold cavity.

2. Apparatus for injection molding as set forth in claim 1 wherein said false cavity has a projected area greater than the projected area of said mold cavity.

3. Apparatus for injection molding as set forth in claim 1 wherein the rear face of said second mold plate has an annular projection formed thereon and the adjacent face of said backing plate has an annular groove formed therein to receive said annular projection.

4. Apparatus for injection molding as set forth in claim 1 including stop means operatively connected to said urging means for preventing rearward movement of the backing plate away from said second mold plate.

* * * * *